(12) United States Patent
Bayer et al.

(10) Patent No.: US 11,911,980 B2
(45) Date of Patent: Feb. 27, 2024

(54) UNIDIRECTIONALLY FIBER-REINFORCED ENDLESS WINDING PLY

(71) Applicant: PROFOL GMBH, Halfing (DE)

(72) Inventors: Helmut Bayer, Kienberg (DE); Konrad Maier, Wasserburg (DE)

(73) Assignee: Profol GmbH, Halfing (DE)

( * ) Notice: Subject to any disclaimer, the term of this patent is extended or adjusted under 35 U.S.C. 154(b) by 298 days.

(21) Appl. No.: 17/289,627

(22) PCT Filed: Oct. 30, 2019

(86) PCT No.: PCT/EP2019/079666
§ 371 (c)(1),
(2) Date: Apr. 28, 2021

(87) PCT Pub. No.: WO2020/089295
PCT Pub. Date: May 7, 2020

(65) Prior Publication Data
US 2021/0339486 A1 Nov. 4, 2021

(30) Foreign Application Priority Data

Oct. 30, 2018 (EP) .................................. 18203382

(51) Int. Cl.
*B29C 70/50* (2006.01)
*B29C 65/08* (2006.01)
(Continued)

(52) U.S. Cl.
CPC ............. *B29C 70/50* (2013.01); *B29C 65/08* (2013.01); *B29C 66/1122* (2013.01);
(Continued)

(58) Field of Classification Search
None
See application file for complete search history.

(56) References Cited

U.S. PATENT DOCUMENTS

| 5,766,725 A | 6/1998 | Hogenboom et al. |
| 6,585,842 B1 | 7/2003 | Bompard et al. |
| 2013/0217558 A1 | 8/2013 | Gloeckner et al. |

FOREIGN PATENT DOCUMENTS

| EP | 0740996 | 11/1996 |
| EP | 2301735 A2 | 3/2011 |

(Continued)

OTHER PUBLICATIONS

English Translation of Extended European Search Report dated May 10, 2019 for European Patent Application No. 18203382.9.

(Continued)

*Primary Examiner* — Alexander S Thomas
(74) *Attorney, Agent, or Firm* — McCarter & English, LLP

(57) ABSTRACT

The invention relates to a single-ply semi-finished product web which is reinforced with unidirectionally orientated continuous fibers and exhibits a movement direction and comprises a matrix containing at least 60% by weight of one or more thermoplastic polymers selected from the group consisting of polyamide, polyolefin and mixtures thereof and comprising welding seams of overlapping fiber-reinforced semi-finished product web segments at periodically occurring intervals, wherein the fiber plies of the fiber-reinforced semi-finished product web segments overlap, wherein the thickness of the semi-finished product web in the region of the welding seams is at least exactly as high as the arithmetic mean of the other regions of the semi-finished product web, and wherein the width of the regions of the welding seams is more than 1 mm to 8 mm in the movement direction, and wherein the thickness of the semi-finished product web in the regions outside the regions of the welding seams is 0.01 mm to 0.40 mm, and wherein the unidirectionally orientated continuous fibers enclose a predetermined angle with the movement direction, the value α of (Continued)

which is in the range of more than 0° to 90°, and to a method for its manufacture and to its use for manufacturing a multi-layer composite material and/or organic sheet.

16 Claims, 6 Drawing Sheets

(51) Int. Cl.
    *B29C 65/00*        (2006.01)
    *B29C 70/54*        (2006.01)

(52) U.S. Cl.
    CPC ........ *B29C 66/1142* (2013.01); *B29C 66/435* (2013.01); *B29C 66/71* (2013.01); *B29C 66/7212* (2013.01); *B29C 66/72141* (2013.01); *B29C 70/543* (2013.01); *B29C 70/545* (2013.01); *Y10T 428/19* (2015.01)

(56) References Cited

FOREIGN PATENT DOCUMENTS

| | | | |
|---|---|---|---|
| EP | 2377673 | A1 | 10/2011 |
| EP | 3243641 | A1 | 11/2015 |
| JP | H07 227841 | A | 8/1995 |
| WO | WO 2012/123302 | A1 | 9/2012 |
| WO | WO 2014086482 | A1 | 6/2014 |
| WO | WO 2015/082385 | A1 | 6/2015 |
| WO | WO 2017/220327 | A1 | 12/2017 |

OTHER PUBLICATIONS

English Translation of European Examination Reported dated May 12, 2022 for European Patent Application No. 18203382.9-1103.

European Result of Consulation dated Sep. 1, 20233 for European Patent Application No. 18203382.9.

Eurogean Intention to Grant dated Nov. 15, 2022 for Eurogean Patent Application No. 18203382.9.

PCT International Search Report and Written Opinion dated Jan. 21, 2020 for PCT/EP2019/079666.

European Examination Report dated May 12, 2022 for European Patent Application No. 18203382.9-1103.

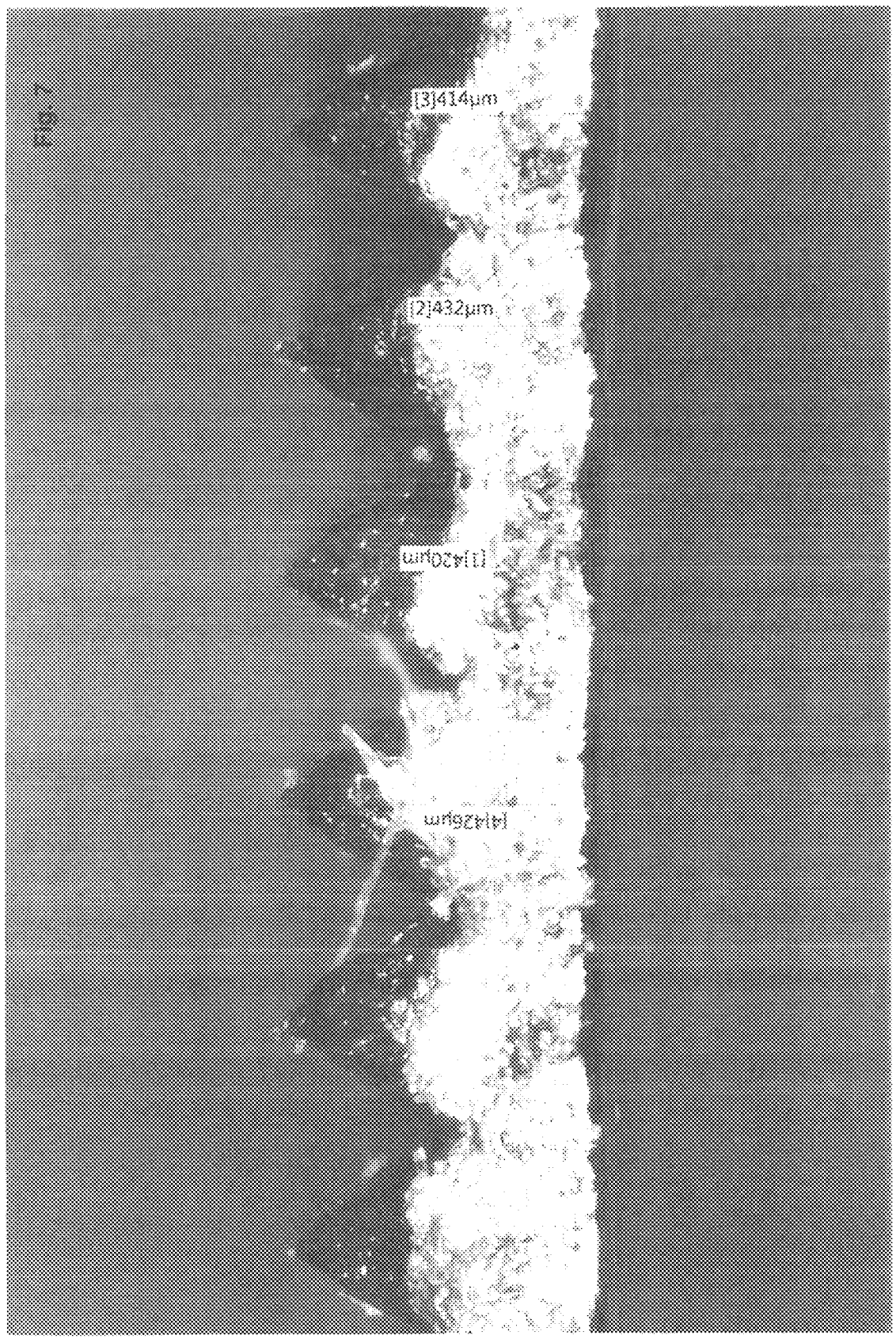

UNIDIRECTIONALLY FIBER-REINFORCED ENDLESS WINDING PLY

CROSS-REFERENCE TO RELATED APPLICATION

This application is a 35 U.S.C. § 371 National Stage filing of International Application No. PCT/EP2019/079666, filed on Oct. 30, 2019, which claims priority to European Patent Application 18203382.9 filed on Oct. 30, 2018.

BACKGROUND

1. Technical Field

The invention relates to a semi-finished product web reinforced with unidirectional continuous fibers, in particular as an endless winding ply, wherein the continuous fibers exhibit a defined orientation which deviates from the movement direction (so-called X° tape). The invention also relates to: a method for manufacturing the X° tapes and endless winding ply in accordance with the invention; and their use for manufacturing a multi-layer composite material, for example an organic sheet; and a multi-layer composite material comprising at least one layer made of the semi-finished product web in accordance with the invention.

2. Background Art

Organic sheets, which can combine high mechanical stability with low weight, have been used for some time now as a replacement for sheet metal, in particular in automobile and aircraft construction. Organic sheets are supplied for example by Bond-Laminates GmbH, Brilon, Germany under the name Tepex® and by BASF SE, Ludwigshafen, Germany as Ultracom®. Organic sheets are fiber-matrix semi-finished products which generally consist of a fiber fabric or fiber scrim embedded in a thermoplastic matrix. Since the tensile and compressive behavior and other mechanical and thermal properties of organic sheets, unlike sheet metal, are non-isotropic and dependent on the orientation of the fibers, in part short fibers or fiber fabrics which are dispersed in an unregulated manner are embedded in a thermoplastic matrix. Continuous fibers do however provide particular mechanical stability.

Methods for manufacturing semi-finished product webs as constituents of organic sheets have been proposed in which fibers and matrix material are placed on a base web and then connected in a subsequent step (for example EP 3 077 308 A1).

Alternatively, components made of organic sheets are known which are manufactured by cutting off segments of so-called 0° tapes, i.e. segments of band-shaped webs which exhibit fiber reinforcement using parallel continuous fibers arranged in parallel in the movement direction and embedded in a thermoplastic resin matrix, and placing these segments one on top of the another in multiple plies in a particular mold of a pressing tool and/or laminating tool and then laminating them at pressure and heat. An organic sheet is therefore a multi-layer composite material in which the layers correspond to the fiber-reinforced or as applicable also non-fiber-reinforced semi-finished product webs/bands. Because the different plies of the segments can then exhibit a different orientation of the fiber reinforcement, organic sheets having predetermined tensile forces and thermal and mechanical properties in predetermined desired directions of the component can be achieved, although they are relatively costly to produce. Within the meaning of the present disclosure, "movement direction" is synonymous with the main direction of the web (or the direction of the main web) of a band. A 0° tape (0° UD tape, 0 tape, 0° UD band, 0° band, 0 band) thus exhibits fibers which extend substantially parallel to the movement direction of the band.

By contrast, organic sheets can be manufactured in a particularly versatile, variable and particularly economical manner by laminating multiple prefabricated semi-finished product webs/bands, wherein the semi-finished product webs/bands to be laminated each contain a thermoplastic matrix made of preferably the same plastic or compatible thermoplastic resins and reinforcing fibers orientated substantially in parallel within a semi-finished product web/band. In order to make the properties which are anisotropic within a semi-finished product web/band, i.e. within a ply, available in multiple directions of the plane, plies consisting of bands having different orientations of the fibers can be laminated. Such an organic sheet then for example consists of up to ten plies or more which have been cut from semi-finished product webs/bands having at least two different fiber orientations.

The (mechanical) properties of a ply or composite of different plies can be evaluated and predicted to a high level of accuracy if the fiber density within a semi-finished product web/band is not subject to major fluctuations. Tensile load, stiffness, strength and thermal expansion are in particular dependent on the fiber density. In order to improve the quality tolerances and predictability and evaluability of these parameters, the semi-finished product webs/bands should not therefore exhibit any irregularly or periodically recurring "flaws" exhibiting a significantly lower fiber density.

The simplest example of single-ply semi-finished product webs which are reinforced with unidirectional continuous fibers are the aforesaid 0° UD tapes (UD=unidirectional), in which the continuous fibers which are arranged in parallel are embedded in a thermoplastic matrix and orientated substantially exactly parallel to the movement direction. Such 0° UD tapes and their manufacture are described inter alia in WO 2012/123302 A1. In addition to 0° tapes, so-called X° UD tapes (or X° tapes and/or X tapes, X° bands, X° UD bands, X bands) are known, i.e. bands which likewise contain continuous fibers arranged parallel to each other and embedded in a thermoplastic matrix, but in which the fiber direction forms an angle other than 0° with respect to the movement direction. This angle is usually given as an angular value, i.e. in a range of more than 0° to 90°. A 90° UD tape (90° tape, 90 tape, etc.) thus contains fibers which are parallel to each other and extend exactly transversely to the movement direction.

It is known that X° tapes can be manufactured using 0° UD tapes. Thus, each of EP 2 377 673 A2, EP 0 740 996 A1, U.S. Pat. No. 5,766,725 or also DE 10 2012 111 761 A1 describe for example methods in which portions of a 0° UD tape are placed next to each other on a web base, i.e. on an already extant thermoplastic web, and laminated such that the fibers of the portions continue to be parallel but are orientated at an angle of more than 0° up to 90° with respect to the movement direction of the web base. In the bands manufactured in this way, which are at least two-ply and never single-ply, a stabilizing web base is required for the mechanical strength of the band and for connecting the 0° UD tape portions to each other. A web manufactured in this way exhibits a greater thickness, less flexibility, poor winding properties and a lower fiber density which is above all not uniform over the entire thickness.

Manufacturing single-ply X° tapes using portions of 0° UD tapes, i.e. without using a web base to which the portions are connected, in order to form a ply of X° tape has also already been described. EP 3 243 641 A1 describes a method in which portions of a 0° UD tape are placed flush ("abutted"), i.e. abutting each other, on a "table" which can be moved in the new band direction, followed by welding, thus forming the X° tape. EP 3 243 641 A1 expressly emphasizes that the 0° UD tape is placed abutting, in order to avoid deformation of the resultant X° tape.

Common to all these known methods is that the portions are positioned abutting before they are then connected by a welding method, wherein at the abutment, the thermoplastic matrix material which is liquefied in the welding process flows into the spaces between the abutments. Irregularities at the abutting edges, which can be due to different cutting blades and/or cutting edges thereof or to other influences, may inevitably lead to undesired flaws and/or an undesired constriction or thinning of the web in the region of the welding seam. Equally, when the portions are placed abutting, it is never possible to fit them together ideally, with no gaps, before welding them. Thus, when dispersing the thermoplastic matrix material during welding, a zone is inevitably created in the region of the welding seam in which the density and/or content of reinforcing fibers and therefore also the proportional weight of fibers is lower than in the other regions of the web and/or lower than the arithmetic average in the rest of the web outside the welding seams. This causes two disadvantages: on the one hand, mechanical stability in the movement direction of the X° tape manufactured is impaired, since there is insufficient thermoplastic available to close every gap and so obtain a uniform thickness of the web; on the other hand, regions arise—inevitably and at periodically recurring intervals (i.e. at the welding seams)—in which the content of reinforcing fibers, which can be measured as the weight of fibers per unit length in the movement direction, is lower than the arithmetic average of the rest of the web outside the welding seams, up to and including portions which practically no longer exhibit any fibers at all. This is disadvantageous inter alia against the background of the fact that the X° tapes manufactured are intended to be used as plies in organic sheets, wherein great emphasis is placed on the evaluability and predictability of the anisotropic mechanical and thermal properties. Predictability and evaluability, however, presuppose a broad consistency and or at least a minimum density and/or minimum content of reinforcing fibers which is as continuous as possible. Recurring zones exhibiting a lower fiber content and/or fiber weight and/or fiber density cause undesired and unevaluable flaws in the organic sheet.

SUMMARY

It is the object of the invention to solve one or more of the above-mentioned difficulties of the prior art. It is therefore an express aim of the present invention to avoid such flaws. At the same time, it is an object of the invention to provide single-ply X° UD tapes which exhibit sufficient mechanical stability and strength in the movement direction in their welding regions. Another object of the present invention is to provide a method for manufacturing the X° tapes in accordance with the invention, which is characterized by particular speed, quality and efficiency.

At least one and preferably more than one of the objects and disadvantages of the prior art mentioned are met by a single-ply semi-finished product web which is reinforced with unidirectionally orientated continuous fibers and exhibits a movement direction and comprises a matrix containing at least 60% by weight of one or more thermoplastic polymers selected from the group consisting of polyamide, polyolefin and mixtures thereof and comprising welding seams of overlapping fiber-reinforced semi-finished product web segments at periodically occurring intervals, wherein the fiber plies of the fiber-reinforced semi-finished product web segments overlap, wherein the thickness of the semi-finished product web in the region of the welding seams is at least exactly as high as the arithmetic mean of the other regions of the semi-finished product web, and wherein the width of the regions of the welding seams is more than 1 mm to 8 mm in the movement direction, and wherein the thickness of the semi-finished product web in the regions outside the regions of the welding seams is 0.01 mm to 0.40 mm, and wherein the unidirectionally orientated continuous fibers enclose a predetermined angle with the movement direction, the value $\alpha$ of which is in the range of more than 0° to 90°.

BRIEF DESCRIPTION OF THE FIGURES

To assist those of skill in the art in making and using the subject matter of the present disclosure, reference is made to the appended figures, wherein:

FIG. 7 provides a further microscopic reading (at 200-times magnification) of the cross-section of a 90° tape in accordance with the present disclosure.

DETAILED DESCRIPTION

Figure 1:
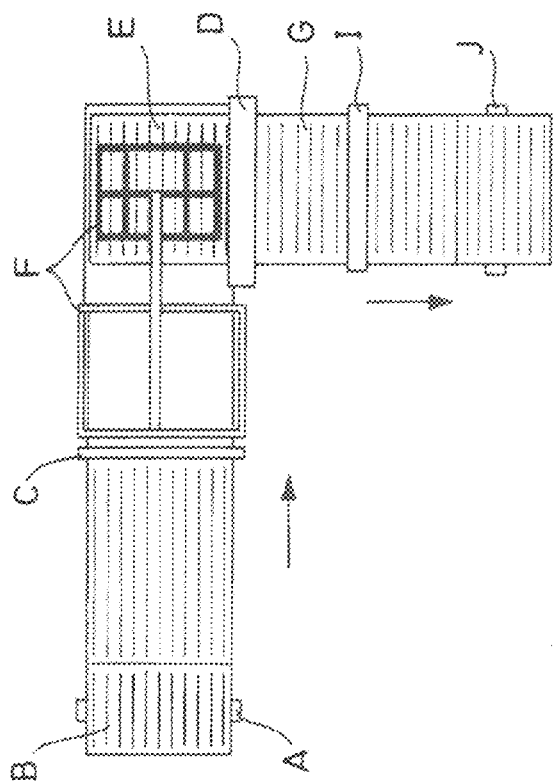
FIG. 1 provides three (2) schematic views of an exemplary device for use in performing the method of the present disclosure.
Figure 1:
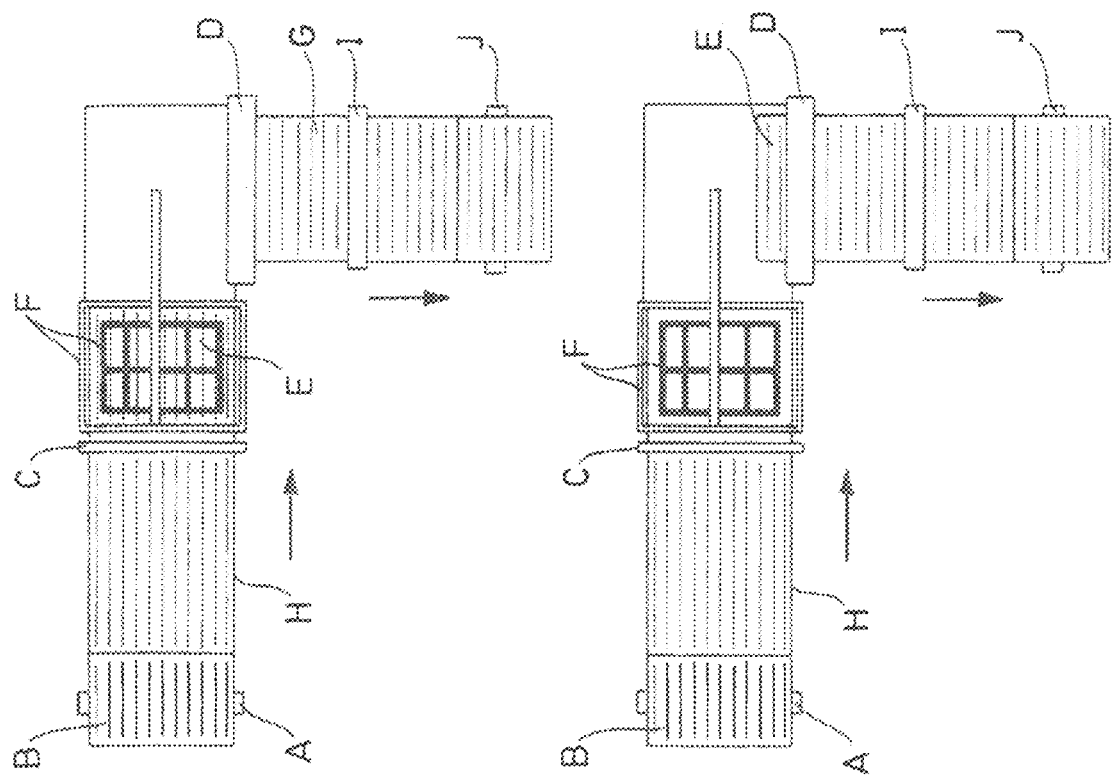

For the purposes of the invention, it is particularly preferred if the welding seams, i.e. the welding seam which occurs at periodically occurring intervals, have been manufactured by ultrasonic welding.

The matrix preferably contains at least 70% by weight and advantageously for example at most 98% by weight or 75% to 95% by weight and/or 80% to 90% by weight of thermoplastic polymer(s); most particularly preferably, the matrix consists of one thermoplastic polymer or of a mixture of two or more thermoplastic polymers selected from thermoplastic polyamide, polypropylene and polyethylene. Up to 30% by weight, preferably up to 25%, 20%, 10% or 5% by weight, in relation to the matrix (polymer(s) plus additives) of one or more common additives can be admixed with the thermoplastic polymer(s), preferably selected from flame retardants, anti-dripping agents, thermal stabilizers, mold release agents, antioxidants, UV absorbers, IR absorbers, gamma ray stabilizers, antistatic agents, optical brighteners, light scattering agents, lubricants, thermal and/or hydrolysis stabilizers, flow improvers, elastomer modifiers, emulsifiers, nucleating agents, colorants such as pigments, inorganic fillers and mixtures thereof.

Reinforcing fibers are differentiated into short fibers having a fiber length of 0.1 to 1 mm, long fibers having a fiber length of 1 mm to 50 mm and continuous fibers having a fiber length of more than 50 mm. In accordance with the invention, the continuous fibers can also have an arithmetic mean length of 50 mm to 10,000 mm or 200 to 1000 mm Fibers having a length in the movement direction which substantially corresponds to the dimensions of the semi-finished product web which they are intended to reinforce are also continuous fibers within the meaning of the invention, wherein the person skilled in the art will understand that the length of continuous fibers in X° tapes are limited by the side edges of the X° tape. In accordance with the invention, the proportion of continuous fibers in the reinforcing fibers is generally more than 90%, preferably more than 95%, most particularly preferably more than 98%. The highest stiffness and strength values are achieved using continuous fibers.

A semi-finished product web in accordance with the present invention is also referred to as a ply, wherein a continuous ply denotes a ply (a semi-finished product web, a 0° tape and/or an X° tape) which can in principle and practice be continuous or exhibit a length of up to 3000 m, preferably up to 2500 m, for example up to 2000 m and for example at least more than 100 m, preferably more than 1000 m and for example 1800 to 1900 m.

A semi-finished product web in accordance with the present invention exhibits a movement direction in the direction of its longest extent. A semi-finished product web in accordance with the invention can usually be wound onto a roll and/or roller, wherein various winding methods and winding angles are available in principle. This is then described as a wound ply; a wound ply made of a continuous ply (a continuous semi-finished product web) is correspondingly described as a continuous wound ply. The term "web" and/or "semi-finished product web" within the meaning of the present disclosure also includes an "emerging" web, which may consist of only a few segments.

The welding seam is the region in which, during welding, the thermoplastic material (polymer) is softened until liquefied. The semi-finished product webs in accordance with the invention differ substantially from conventional X° tapes inter alia in that fiber-reinforced semi-finished product web segments overlap in the region of the welding seam(s), wherein the fiber plies of the fiber-reinforced semi-finished product web segments overlap. The person skilled in the art will recognize, in a microscopic recording of the cross-section of the semi-finished product web in the region of the welding seam, whether the fiber plies of the fiber-reinforced semi-finished product web segments overlap.

The overlap in accordance with the invention in the region of the welding seam(s) ensures that both the thickness in the region of the welding seam and the arithmetic mean proportional weight of fibers in the region of the welding seam do not drop below the arithmetic mean values of the other regions outside the welding seams. At least one parameter, i.e. the arithmetic mean thickness or proportional weight of fibers, in the region of the welding seam is preferably above the corresponding arithmetic mean values of the other regions outside the welding seam, from which the person skilled in the art will likewise recognize the overlap in the region of the welding seam. Most particularly preferably, both parameters in the region of the welding seam are above the corresponding values outside the welding seam, wherein the proportional weight of fibers can for example be determined by cutting the region to be examined (for example, the welding seam) out of the semi-finished product web, determining its weight, incinerating it and determining its weight again. The difference between the initial weight and the final weight is then the weight of fibers. The quotient of the weight of fibers to the initial weight is the proportional weight of fibers. This measurement can for example be repeated over at least 15 (as far as possible consecutive) welding seams and ideally over the entire semi-finished product web, and the arithmetic mean can be formed in order to determine the arithmetic mean within the meaning of the invention.

The proportional weight of fibers is then understood to mean the relative proportion of the fibers within the total weight of the semi-finished product containing the matrix (polymers plus additives, if any) and the reinforcing fibers.

The overlap in accordance with the invention in the region of the welding seam(s) also ensures that the weight of fibers per unit length in the movement direction is higher in the region of the welding seams than outside the welding seams. The person skilled in the art will recognize this in the microscopic recording of the cross-section of the semi-finished product web from the larger number of fibers, for example around twice as many fibers per unit length in the movement direction, in the region of the welding seams than in the immediately adjacent regions outside the welding seams.

The person skilled in the art will understand that, where there is an overlap, the welding seam typically exhibits the same width as the overlap. In accordance with the invention, the width of the welding seam is typically identical to the width of the overlap.

The welding seam has a width in the longitudinal direction (movement direction) of the semi-finished product web of preferably more than 1 mm to 6 mm, advantageously 1.0 mm to 4 mm, particularly preferably 1.0 mm to 3 mm, more preferably 1.2 mm to 3 mm, even more preferably 1.4 to 2.9 mm and most particularly preferably 1.5 to 2.5 mm or about 2 mm.

In accordance with the invention, the thickness in the region of the welding seams of the semi-finished product web is at least exactly as high as the arithmetic mean of the other regions of the semi-finished product web, preferably at least 1.2 times as high. Due to welding, the arithmetic mean thickness in the region of the welding seams will generally be 1.1 to 2.0 times the arithmetic mean of the other regions of the semi-finished product web, preferably 1.1 to 1.8 times or 1.1 to 1.6 times and particularly preferably 1.1 to 1.2 times, possibly also 1.2 to 1.7 times and 1.3 to 1.5 times. Since the welding seam is not necessarily level and can for example exhibit a serrated rib pattern, the thickness of the semi-finished product web in the region of the welding seams can preferably vary between 1.2 and 4.0 times or more preferably between 1.5 and 3.0 times the arithmetic mean of the other regions of the semi-finished product web. The thickness of the semi-finished product web in the regions outside the regions of the welding seams is preferably 0.10 to 0.30 mm, particularly 0.15 to 0.25 mm, most particularly 0.18 to 0.23 mm, 0.19 to 0.22 mm or specifically 0.20 to 0.22 mm, for example about 0.21 mm.

The arithmetic mean proportional weight of fibers in the region of the welding seam is preferably higher than the arithmetic mean of the other regions of the semi-finished product web. The weight of fibers per unit length in the movement direction, arithmetically averaged over all the welding seams of a semi-finished product web, can also preferably be higher than and at most twice the arithmetic mean of the other regions of the semi-finished product web. The fiber density, i.e. the number of fibers per unit of length in the movement direction, is therefore also preferably at least exactly as high as in the other regions of the semi-finished product web, measured as the arithmetic mean. Preferably, the weight of fibers per unit length in the movement direction, arithmetically averaged over all the welding seams of a semi-finished product web, in the region of the welding seam is 1.4 to 2.0, preferably 1.8 to 2.0 times as high as the arithmetic mean of the other regions of the semi-finished product web.

The semi-finished product web in accordance with the invention generally exhibits the same mean proportional weight of fibers in the regions outside the welding seams as the initial semi-finished product web. Arithmetically averaged, this proportional weight of fibers is preferably 50% to 90% by weight, particularly 60% to 80% by weight, or most particularly in the range of 65% to 75% by weight, most particularly about 72% by weight.

The definition of a semi-finished product web as used here is intended to also include an "emerging" web which may consist of only a few segments. Particularly preferably, however, a web comprises a ply having a minimum length of 20 m, even more preferably at least 500 m.

The width of the web is not essential to the invention and can be adapted to the specific practical requirements for using the semi-finished product web. The width can for example be in the range of 30 to 250 cm, in the range of 30 to 150 cm or 60 to 130 cm or also in the range of 115 to 128 cm or specifically around 124 cm or precisely 124.0 cm.

The unidirectionally orientated continuous fibers can in principle enclose any predetermined angle with the main direction of the web, the value α of which is in the range of more than 0° to 90°. Angles which are significantly different from 0°, for example angles of at least 10° or at least 20°, are however preferred, wherein specific X tapes in accordance with the present invention include 30° tapes, 45° tapes, 60° tapes and 90° tapes, wherein as already described, a 45° tape is for example understood to mean a semi-finished product web in which the fibers deviate from the movement direction by 45° in one of the two possible directions.

In accordance with the invention, any types of reinforcing fibers can be used as the fibers, such as glass fibers, polymer fibers such as for example aramid fibers, polyester fibers, polyamide fibers such as nylon fibers, polyethylene fibers, Plexiglas fibers, carbon fibers, mineral fibers or inorganic synthetic fibers, basalt fibers, boron fibers, silica fibers, ceramic fibers, steel fibers, wood fibers, flax fibers, hemp fibers, jute fibers, kenaf fibers, ramie fibers, sisal fibers and combinations thereof. Glass fibers and carbon fibers are particularly preferred.

Glass-fiber-reinforced semi-finished product webs in accordance with the invention are distinguished inter alia by their low weight and economical manufacture. The fibers preferably have a diameter in the range of 6 to 19 μm, but can also have a smaller or larger diameter.

The thermoplastic polymers of the plastic matrix preferably have a lower melting point than the reinforcing fibers, wherein the matrix comprises one or more of the thermoplastic polymers polyolefin and/or polyamide (PA) and/or combinations thereof. Polypropylene and/or polyamide are particularly preferred. The matrix particularly preferably does not contain any other thermoplastic resins. Polymers such as polycarbonate or polyimide are preferably not used.

Suitable polyamides include for example homopolyamides, copolyamides and mixtures thereof. Partly crystalline and/or amorphous polyamides are preferably used, such as for example polyamide-6, polyamide-6,6, polyamides in which the acid component contains terephthalic acid, isophthalic acid, suberic acid, sebacic acid, azelaic acid, adipic acid and/or cyclohexane dicarboxylic acid and/or the diamine component contains m- and/or p-xylylene diamine, hexamethylene diamine, 2,2,4-trimethylhexane methylene diamine, 2,4,4-trimethylhexamethylene diamine and/or isophorone diamine.

Suitable polyolefins include for example: polyethylene (PE), polypropylene (PP) or ethylene-propylene copolymers.

In the semi-finished product web in accordance with the invention, the distances from welding seam to welding seam in the main direction of the web, as measured from the start of the welding seam to the start of the following welding seam, can preferably be 30 to 150 cm, in particular 60 to 130 cm, preferably 115.0 to 128.0 cm.

A particularly configured embodiment of the invention relates to a continuous wound ply consisting of one or more wound semi-finished product webs in accordance with the present invention.

Semi-finished product webs or X° tapes in accordance with the invention cannot be produced using the methods known from the prior art. Conventional X° tapes, even if they are single-ply at all, do not show any overlapping of fiber plies in the region of the welding seams due to their method of manufacture. They show a lower weight of fibers per unit length in the movement direction than in the immediately adjacent regions outside the welding seams. They do not show an increased weight of fibers per unit length in the movement direction, arithmetically averaged over all the welding seams of a semi-finished product web, as compared to the arithmetic mean of the other regions of the semi-finished product web. They show a lower arithmetic mean proportional weight of fibers and/or thickness in the region of the welding seams than in the regions outside the welding seams.

The method in accordance with the invention for manufacturing a semi-finished product web comprises the steps of:
a) introducing a single-ply initial semi-finished product web which is reinforced with continuous fibers orientated unidirectionally in the main direction of the initial semi-finished product web and in which the unidirectionally orientated continuous fibers are embedded in a matrix containing at least 60% by weight of one or more thermoplastic polymers selected from the group consisting of polyamide, polyolefin and mixtures thereof, and which exhibits two opposing, parallel peripheral edges spaced apart by the width of the initial semi-finished product web and extending in the main direction of the initial semi-finished product web, wherein the dispersal of the fibers in the initial semi-finished product web extends over the entire width;
b) severing parallelogram-shaped segments of the initial semi-finished product web, wherein the segments exhibit two opposing, parallel cutting edges in addition to the two opposing, parallel peripheral edges, wherein one cutting edge exhibits a predetermined angle with respect to the perpendicular of the peripheral edge in the segment, the value β of which is in the range of 0° to less than 90°, where α+β=90°;
c) positioning one or more of the segments on the semi-finished product web to be lengthened, such that the peripheral edges of the segments are parallel and overlap adjacent segments at the peripheral edges, wherein the overlap is more than 1 to 8 mm, preferably 1.0 to 6 mm, particularly preferably 1.0 to 3 mm, even more preferably 1.4 to 2.9 mm and most particularly preferably 1.5 to 2.5 mm or about 2 mm, wherein the cutting edges also lie along the main direction of the semi-finished product web and form the peripheral edges of the new semi-finished product web, and wherein the unidirectionally orientated continuous fibers of the segments enclose a predetermined angle with the main direction of the web, the value of which is α;

d) connecting the adjacent segments by ultrasonic welding, forming a welding seam, wherein the welding seam substantially completely encompasses the region of the overlap of the segments.

Using the method in accordance with the invention, the semi-finished product webs in accordance with the invention can be manufactured advantageously and economically.

The method in accordance with the invention does not require welding wires or foils or tapes which are additionally inserted as welding aids. This considerably simplifies the method, avoids the time-consuming guiding of wires and/or positioning of foils and ensures a maximum degree of material uniformity and evaluability of the anisotropic properties of the X° tape semi-finished product web in accordance with the invention.

The overlap in method step c), as measured in the movement direction of the resultant semi-finished product in accordance with the invention, preferably corresponds to the width of the welding seam, but can also be smaller.

The cutting edges of the segments are then generally substantially rectangular and substantially level and substantially perpendicular to the main surface of the web and/or segments.

Positioning the segments overlapping firstly enables them to be positioned significantly more easily and quickly, and this alone is already an advantage over placing them "abutting". In addition, the process becomes more reliable, i.e. there is less incorrect positioning, and flaws are avoided. Ultrasonic welding, preferably using pressure, ensures an accelerated method. The heat required to soften the thermoplastic is generated directly and completely in situ in the welding seam and does not have to firstly penetrate inwards from the outside. The inventors have also found that the connection strength between the segments in the region of the welding seam is increased using the method in accordance with the invention, i.e. at an increased fiber density and/or an increased proportional weight of fibers in the region of the welding seam. This contradicts prejudices from the prior art which essentially assume a weakening of the bond when the fiber content in the region of a (conventional) welding seam is increased. This may—without wishing to be bound by this theory—be due to the fibers twisting or vibrating into each other during the ultrasonic welding process.

In accordance with the invention, it is particularly preferred if the continuous fibers embedded in the matrix made of thermoplastic material are completely or almost completely enveloped in thermoplastic resin. The initial semi-finished product web particularly preferably does not exhibit a peripheral region having a reduced fiber density.

The person skilled in the art will recognize that the method in accordance with the invention can be performed continuously and discontinuously. The segments can for example be cut from the initial semi-finished product web (initial wound ply, 0° UD tape) in a separate process step, which can also be temporally and/or spatially separate from the rest of the method, and stored, for example stacked, before they are then for example positioned overlapping, in accordance with the invention, by a positioning device and welded. This can for example be performed in such a way that the stack as a whole is rotated into position (for example by 90°) and the individual segments are then removed from the rotated stack, without being rotated further, using conventional positioning and transport devices (for example, a transport spider). It is however of particular interest, and associated with particular advantages, to perform the invention (semi)continuously, wherein individual (or even multiple) segments are continuously cut off from an initial semi-finished product web (initial wound ply, a 0° band), rotated, positioned and welded at a defined angle, such that the manufacturing device delivers an X° tape continuous wound ply on the product side which is wound to the same extent as a 0° UD tape initial wound ply is unwound and introduced on the input side.

In conventional methods, robots in so-called cross-ply ("pick and place") systems assume the role of cutting individual segments out of an initial semi-finished product web and, for example after rotating them by 90°, placing the segments on a web, abutting the previously placed segments. Such an individual process is so involved that it can only advance the web about two meters per minute. Using the method in accordance with the invention, it is typically possible to advance the web up to 12 meters per minute. The method in accordance with the invention also creates less waste and rejects.

As already described further above on the basis of the distances from welding seam to welding seam in the main direction of the web, as measured from the start of the welding seam to the start of the following welding seam, the segments of the initial semi-finished product web can preferably exhibit a cutting edge having a length of 30 to 150 cm, in particular 60 to 130 cm and preferably 115 to 128 cm. When manufacturing a 90° tape, the (length of the) cutting edge—transverse to the movement direction of the initial semi-finished product web—corresponds to the width of the initial semi-finished product web.

The method step c) which is required in accordance with the invention, i.e. positioning the segments overlapping, means that a thickening of the semi-finished product webs in the region of the welding seams is accepted in principle. This is not however a disadvantage, since the thickening has no noticeable negative impact in the subsequent method. It is however preferably possible in accordance with the invention to append a step e) of pressure-treating ("flattening" or smoothing) the welding seams, such that the thickness of the body of the web in the region of the welding seams is in the range of 1.0 to 1.5 times, 1.1 to 1.5 times or 1.2 to 1.4 times the other arithmetically averaged thickness of the body of the web, wherein other thickness ratios can also be advantageously set for the purposes of the invention. The thickness can for example be set such that thickening no longer occurs at all in the region of the welding seams, i.e. the thickness of the body of the web in the region of the welding seams corresponds to the other thickness of the body of the web. As already stated, this is not immediately achievable in conventional methods in which the segments are positioned "abutting", and the thickness is reduced in the region of the welding seams. Thickening in the region of the welding seams, such as can occur in accordance with the invention, is generally harmless.

Another embodiment of the method in accordance with the invention is characterized in that in each of steps c) and d), an individual segment is positioned overlapping with the semi-finished product web to be lengthened and then ultrasonically welded, before the process is repeated at the new end of the lengthened semi-finished product web, after it has been transported further, by positioning another segment overlapping.

The method in accordance with the invention preferably comprises an additional step f) of winding the semi-finished product web. A continuous wound ply in accordance with the invention can be obtained in accordance with the method described. If, as described, the method contains a step f) of winding the semi-finished product web, a continuous wound ply in accordance with the invention can be obtained on a roll, which can be commercialized without further modifications and used for its applications in which the advantages of the availability of inexpensive and quickly manufactured X° tapes as continuous wound plies having practically any desired angular value X can be used.

In accordance with the invention, the semi-finished product web and/or continuous wound ply in accordance with the invention can accordingly be used for example to manufacture a multi-layer composite material, in particular a multi-layer composite material which comprises at least two layers having mutually differing fiber orientations. Such a multi-layer composite material is also referred to or used as an organic sheet.

The invention therefore also relates to a multi-layer composite material, for example an organic sheet, comprising at least one and preferably at least two layers, each consisting of a semi-finished product web and/or continuous wound ply in accordance with the invention, and preferably comprising at least two layers having mutually differing fiber orientations. Such a multi-layer composite material in accordance with the invention can be a standard organic sheet, comprising for example a layered sequence of X° tapes having the following orientations: 0°, 90°, 0°, 0°, 0°, 0°, 0°, 0°, 90°, 0°. As the person skilled in the art will recognize, different or indeed any combinations and variations can be manufactured in accordance with the invention according to the requirements made.

In a broader sense, an organic sheet in accordance with the invention can also be a multi-layer composite material in accordance with the invention which comprises one or more non-polymer layers, for example metallic layers such as aluminum, copper and/or steel layers. The present invention can also be advantageously employed in such composites. For example, an organic sheet containing multiple (i.e. for example 3 to 12) metal-free layers made of 0° bands and at least one X° tape in accordance with the present invention and one layer (employed for example as a middle, inner or outer layer) made of metallic aluminum (for example as an aluminum foil) and thus exhibits a particular strength of seal, electrical shielding and/or particular flame resistance which make such sheets ideal semi-finished products/composite materials for manufacturing power storage cells and/or for constructing electric-driven automobiles. Organic sheets in accordance with the invention containing a layer made of aluminum foil can be further processed and three-dimensionally deformed, in the same way as metal-free organic sheets in accordance with the invention, in the same tools without additional expenditure on equipment. Instead of a foil, it is also possible to use metallic layers made of metallic fibers, metal fibers bound in a plastic matrix, fiber scrims, fiber fabrics, or other flat metallic structures such as for example nets and grids, wherein the thickness dimensions of the metallic layer are in principle subject to the same limitations as the other layers (layer thicknesses in the range of 0.01 mm to 0.40 mm are typical). The organic sheets in accordance with the invention which contain a metal layer are of great use in particular for bodywork and trim parts in the field of battery and high-voltage components. Depending on the intended application, the advantages in accordance with the invention can be achieved using metal-containing or metal-free organic sheets.

EXAMPLE

The method in accordance with the invention can for example be performed on a device such as is shown in FIG. 1, in which (A) denotes an unwinding device, for example a roll, from which a 0° UD tape can be unwound as an initial semi-finished product web (B) in the form of a continuous wound ply and introduced into the cutting device (C), wherein the cutting device (C) can be any type of cutting device, for example a rotary knife, a squeeze knife, guillotine shears, table shears, a guillotine, a drop knife, lever shears, a laser cutting device, a water jet cutting device, a milling machine, a chopping saw, a band saw, a cutting disc or any other suitable device. The cutting device (C) can preferably be used to set and cut any angles from −90° to +90° (except 0°) with respect to the movement direction of the initial semi-finished product web, i.e. an angular value of more than 0° up to (and including) 90° for the purposes of the present invention.

Figure 2:
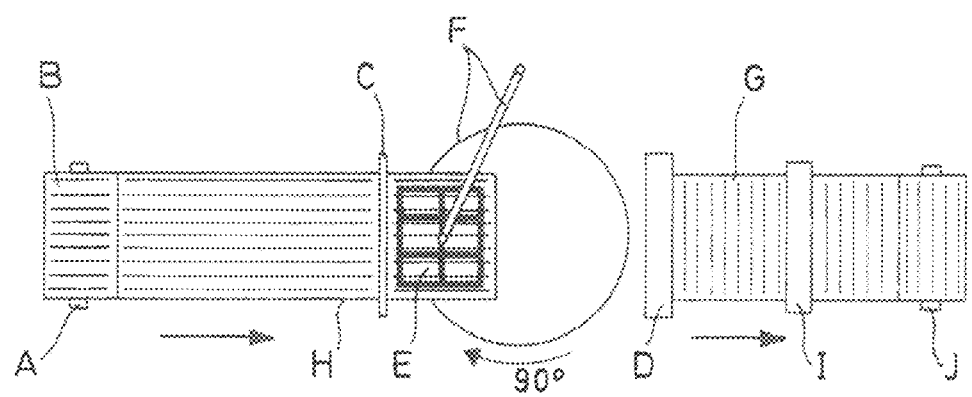
FIG. 2 provides two (2) schematic views of a linear orientation of the device according to the present disclosure.
Figure 2:
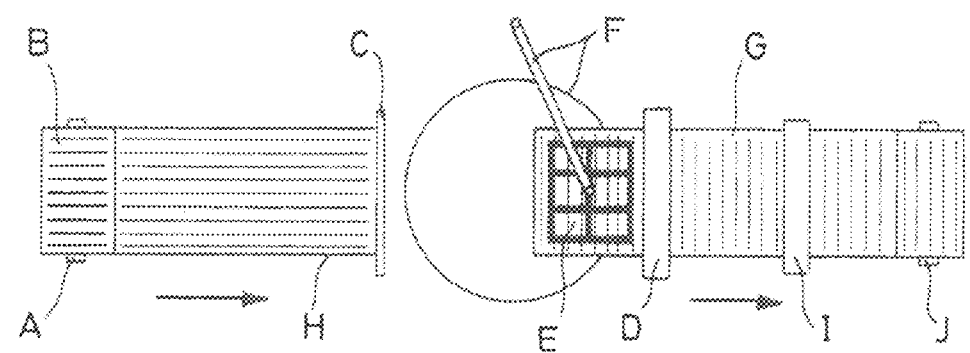
Figure 3:
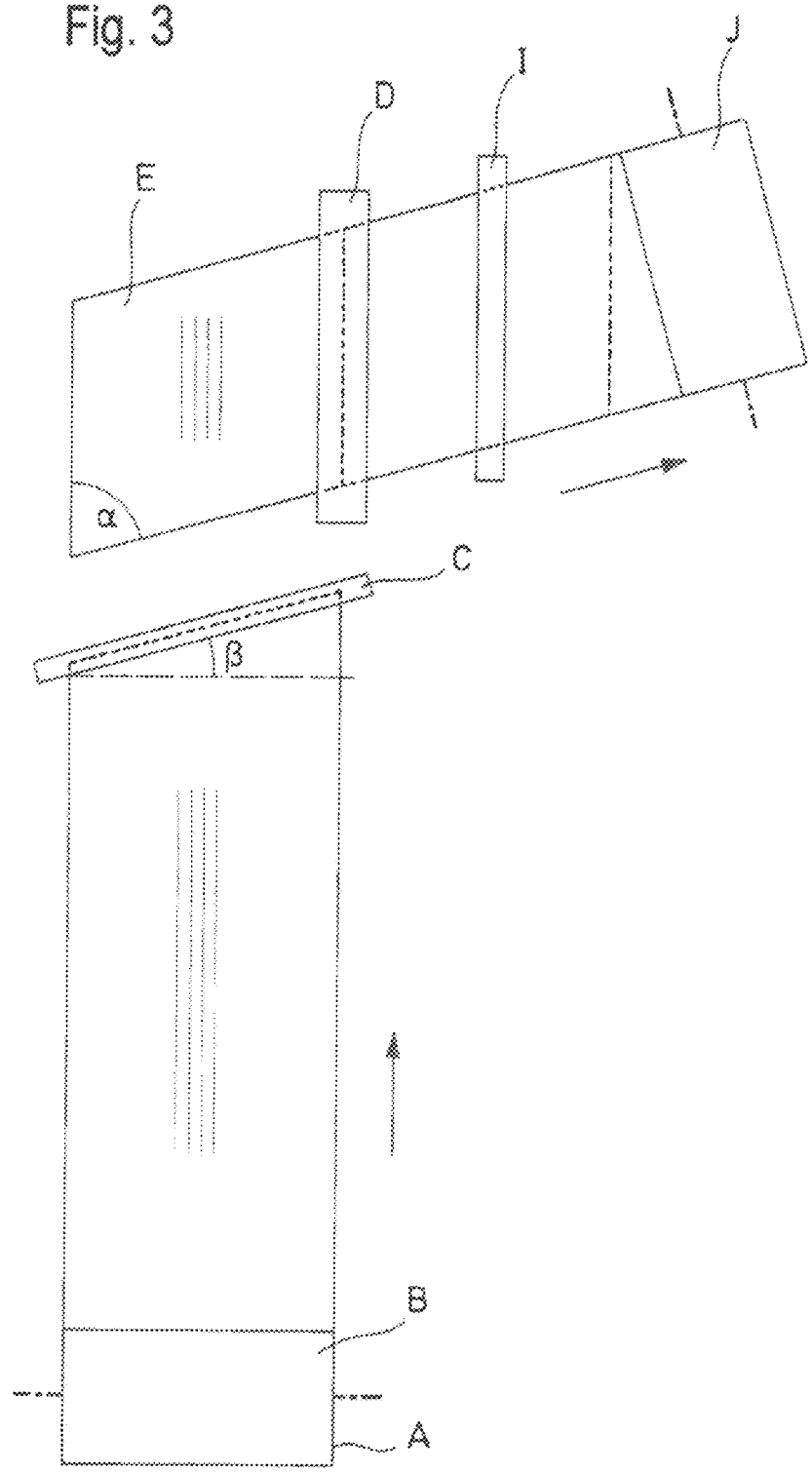
FIG. 3 provides two (2) schematic views of manufacture of an X° band according to the present disclosure.

The advance of the initial semi-finished product web (B) is preferably stopped for the duration of the cutting process. Once severed, the segment (E) can be received by a positioning device (F) and either stored temporarily (for example in the form of a stack of segments) or transported directly to the end of the growing X° band (G) in accordance with the invention and positioned overlapping, wherein different positioning devices (F) and geometries are possible which the person skilled in the art will be aware of in principle. As in FIG. 1, the cutting angle can for example be transferred into a straight orientation of the X° band by an angled feed device (H), or a specific configuration of the positioning device ensures that the segments are received, rotated and orientated such that it is for example possible to orientate the device as a whole linearly (FIG. 2), wherein the positioning device (F) can for example be a robot gripper arm, a robot gripper hand, a turntable, a rotatable suction device or another suitable device which is known in principle. FIG. 3 illustrates the manufacture of an X° UD band in which the fibers enclose an angular value α with the movement direction of the X° band, by severing parallelogram-shaped segments of the initial semi-finished product web, wherein a cutting edge exhibits a predetermined angular value β with respect to the perpendicular of the peripheral edge in the segment, in accordance with step b) of the method in accordance with the invention. The positioning device (F), which is in principle variable, is not shown in FIG. 3.

The degree of overlap between the segments can be non-incrementally adjusted during operation by means of servomotors. The positioning and overlap can for example be ascertained by means of optical measuring systems and correspondingly adjusted manually or in an automated way.

In accordance with the invention, the segments which are positioned overlapping are connected by means of an ultrasonic welding technique. The person skilled in the art will be aware of the ultrasonic welding technique in principle. In ultrasonic welding, a friction welding process, the thermoplastic material is softened by high-frequency mechanical vibrations between 15 and 70 kHz, in most cases 20 to 35 kHz, which cause the welding region to be heated directly due to molecular and interfacial friction. Details of the apparatus of the ultrasonic welding technique can for example be gathered from WO 2017/220327 A1. While conventional thermal welding achieves 10 to 12 welding cycles per minute, ultrasonic welding achieves a multiple of this, for example around 45 welding cycles per minute.

In a particular embodiment of the invention, it is also possible to simultaneously or almost simultaneously cut multiple segments out of the initial semi-finished product web and to simultaneously or almost simultaneously assemble multiple segments, sequentially and overlapping, for welding which can for its part be performed simultaneously or almost simultaneously. For this purpose, it is for example possible to guide multiple initial semi-finished product webs to the welding device or to provide multiple positioning devices (F).

After the welding process using the ultrasonic welding device (D), which can take 0.2 to 0.4 seconds, a smoothing step using a tool (I), for example by pressure treatment ("flattening"), can follow. The lengthened semi-finished product in accordance with the invention is then moved forward by the length of preferably one segment or as many segments as were added in said same step. The X° UD tape continuous wound ply can then be wound continuously, for example onto a roll (J) or a winding core, either linearly or spirally.

Figure 4:
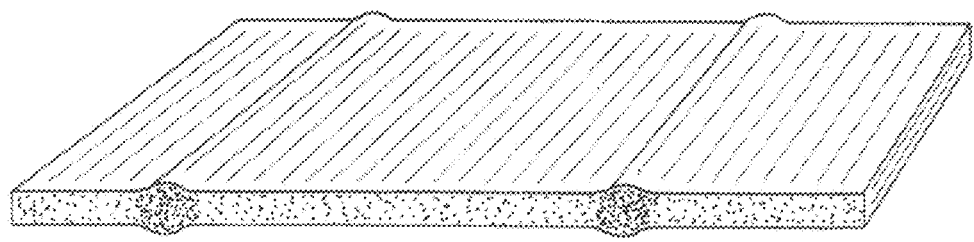
FIG. 4 provides a schematic view of a 90° tape in accordance with the present disclosure.
Figure 5:
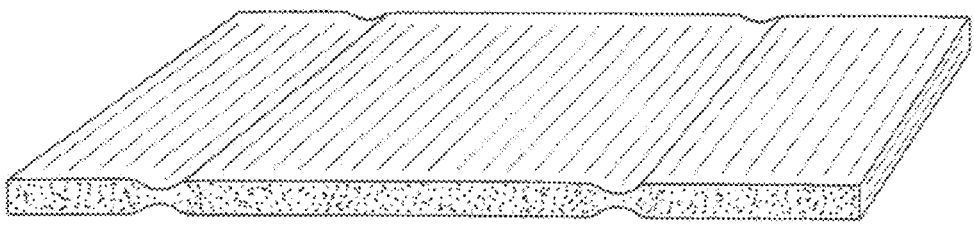
FIG. 5 provides a schematic view of a conventional 90° tape manufactured by connecting abutted segments.

FIG. 4 shows a 90° tape in accordance with the invention. FIG. 5 shows a conventional 90° tape, manufactured by connecting abutted segments.

Figure 6:
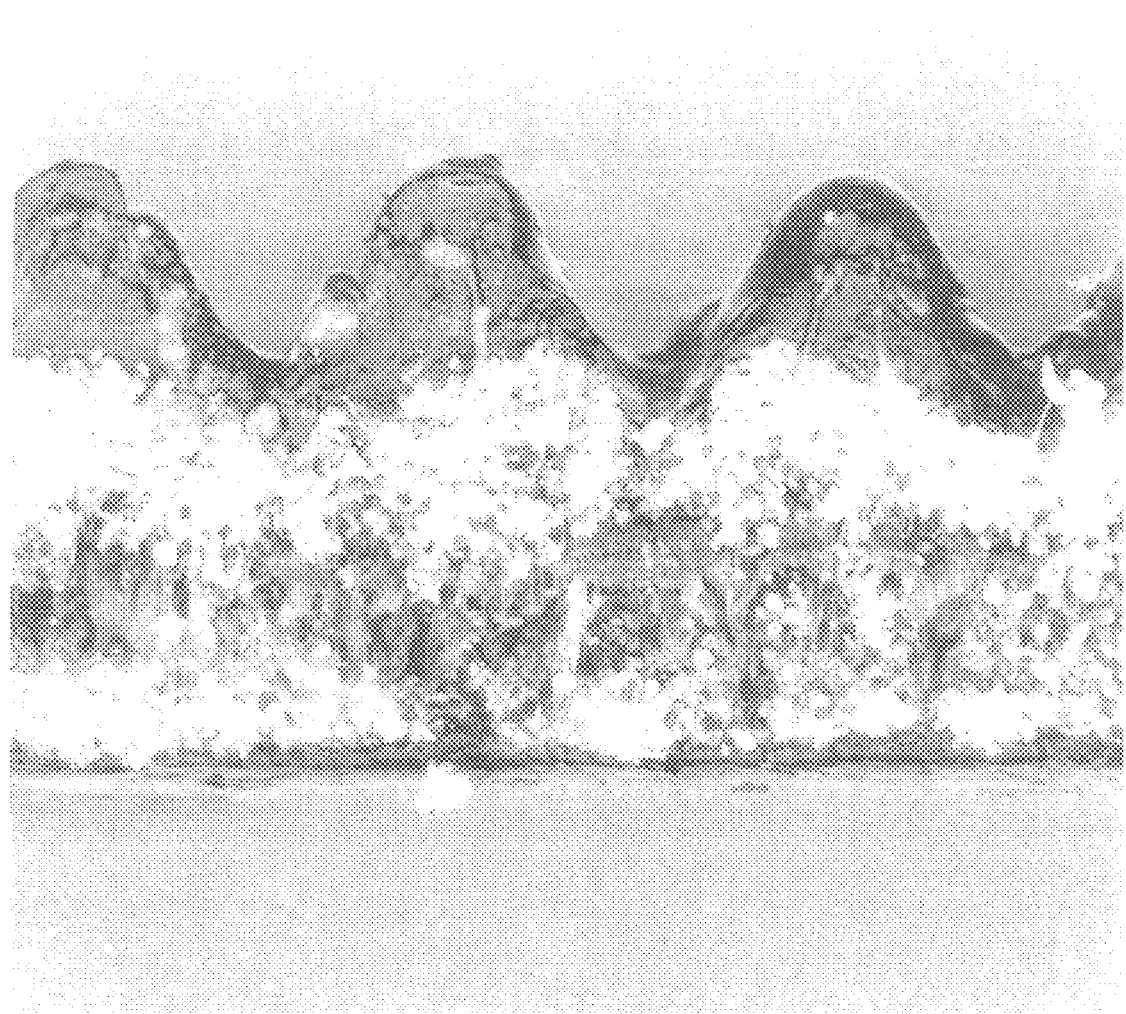
FIG. 6 provides a microscopic recording (at 200-times magnification) of the cross-section of a 90° tape in accordance with the present disclosure.

FIG. 6 shows a microscopic recording (at 200-times magnification) of the cross-section of a 90° tape in accordance with the invention, in the region of the welding seam. The zigzag-shaped surface, created during ultrasonic welding by the correspondingly shaped sonotrode, is clearly identifiable. The two overlapping fiber plies are just as clearly identifiable.

FIG. 7 shows another microscopic recording (at 200-times magnification) of the cross-section of a 90° tape in accordance with the invention, in the region of the welding seam, together with thickness measurements.

Example 1

A 90° UD band having a width of 24.0 cm (350 to 590 μm thick in the region of the welding seam; welding pressure while ultrasonically welding P=2.6×4 PG=1.5 10910N; welding time Sz=0.25 sec; values arithmetically averaged) was manufactured according to the method in accordance with the invention from a 0° UD band having the following characteristics (240 mm wide, 0.23 mm thick, matrix material thermoplastic polypropylene, 47% by volume of fiber content, 72% by weight of proportional weight of fibers over the entire width of the initial semi-finished product web (of the 0° UD band), 17 μm fiber diameter, glass fiber) with an overlap of 2 mm FIG. 6 shows a cross-section from the region of the welding seam. The serrated surface caused by the serrated sonotrode and the increased presence of fibers in the region of the welding seam are clearly identifiable. In Example 1 and the comparative examples, the width of the welding seam corresponded to the overlap.

Comparative Example 2

Example 1 was repeated, with the difference that the segments of the initial semi-finished product web were positioned with an overlap of 1 mm and then ultrasonically welded under the same conditions.

Comparative Example 3

Example 1 was repeated, with the difference that the segments of the initial semi-finished product web were positioned abutting and then ultrasonically welded under the same conditions.

Example 4

Example 1 was repeated, with the difference that instead of ultrasonic welding, the segments were thermally welded in a heat press (welding temperature 160° C., welding pressure P=7.0 bar, welding time Sz=1.0 sec; values averaged arithmetically).

Strips 15 mm wide and 24 cm long in the movement direction were cut (transverse to the movement direction) out of the semi-finished product webs manufactured, each strip encompassing a complete width of a welding seam. The tensile properties in the movement direction were determined according to DIN EN ISO 527-1 (initial load 0.2 N; test speed: 100 mm/min; clamping length at the starting position: 50.00 mm) and arithmetically averaged over multiple measurements. The results are summarized in the following Table 1:

TABLE 1

| | maximum force [N] | breaking force [N] | elongation at break % |
|---|---|---|---|
| Example 1 | 46.7 | 18.7 | 8.6 |
| Comparative Example 2 | 37.2 | n.d. | 1.2 |
| Comparative Example 3 | 10.2 | 10.2 | 0.6 |
| Example 4 | 10.8 | 10.8 | 0.8 |

A comparison of the tensile strength in the movement direction, i.e. transverse to the reinforcing fibers, shows firstly that in the examples obtained by overlapping the segments, the 90° UD tape shows a lower tendency to break in the movement direction than in Comparative Example 3, wherein an overlap of more than 1 mm (Example 1) shows a significant improvement as compared to an overlap of 1 mm (Comparative Example 2). Comparative Example 3 differs from the 90° UD tape 1 in accordance with the invention only in that it was obtained by ultrasonically welding segments which were placed "abutting", i.e. with no overlap. Conventional thermal welding in Example 4 also leads to a slight increase in tensile strength when the segments overlap, which is surprising even in and of itself. The 90° UD tape in which the fiber reinforcements overlap practically never tears at the welding seams but rather always in the intermediate regions. What is particularly striking, however, is the surprising result that the 90° UD tape which overlaps by more than 1 mm in accordance with the invention and is obtained by ultrasonic welding exhibits a significantly increased tensile strength. The present invention thus shows that the overlapping welding seam does not introduce an element of reduced tensile strength, but rather on the contrary increases the tensile strength. A particular effect of a surprising increase in tensile strength occurs when overlapping the segments in accordance with the invention is synergistically combined with connecting the segments by ultrasonic welding.

The invention claimed is:
1. A single-ply semi-finished product web which is reinforced with unidirectionally orientated continuous fibers and exhibits a movement direction and comprises a matrix containing at least 60% by weight of one or more thermo- plastic polymers selected from the group consisting of polyamide, polyolefin and mixtures thereof and comprising welding seams of overlapping fiber-reinforced semi-finished product web segments at periodically occurring intervals, wherein the fiber plies of the fiber-reinforced semi-finished product web segments overlap, wherein the thickness of the semi-finished product web in the region of the welding seams is at least exactly as high as the arithmetic mean of the other regions of the semi-finished product web, and wherein the width of the regions of the welding seams is more than 1 mm to 8 mm in the movement direction, and wherein the thickness of the semi-finished product web in the regions outside the regions of the welding seams is 0.01 mm to 0.40 mm, and wherein the unidirectionally orientated continuous fibers enclose a predetermined angle with the movement direction, the value $\alpha$ of which is in the range of more than 0° to 90°.

2. The semi-finished product web according to claim 1, characterized by at least one of the following features:
   i) in the region of the welding seams, the proportional weight of fibers is at least 1.2 times as high as in the other regions of the semi-finished product web;
   ii) the thickness of the semi-finished product web in the region of the welding seams is at least 1.2 times as high, but not more than 4.0 times as high, as the arithmetic mean of the other regions of the semi-finished product web;
   iii) the weight of fibers per unit length in the movement direction, arithmetically averaged over all the welding seams of a semi-finished product web, in the region of the welding seams is 1.4 to 2.0 times as high as the arithmetic mean of the other regions of the semi-finished product web; and
   iv) in the movement direction of the semi-finished product web, the width of the regions of the welding seams are more than 1 mm to 6 mm.

3. The semi-finished product web according to claim 1, characterized in that the welding seams have been manufactured by ultrasonic welding.

4. The semi-finished product web according to claim 1, characterized in that the fibers comprise at least one of glass fibers, polymer fibers, carbon fibers, mineral fibers, and inorganic synthetic fibers.

5. The semi-finished product web according to claim 1, characterized in that the thickness of the semi-finished product web in the regions outside the regions of the welding seams is 0.15 to 0.25 mm.

6. The semi-finished product web according to claim 1, characterized in that the one or more thermoplastic polymer(s) of the matrix consist(s) of thermoplastic polyamide, polypropylene, polyethylene or mixtures thereof.

7. A continuous wound ply consisting of one or more wound semi-finished product webs according to claim 1.

8. The use of a semi-finished product web according to claim 1 for manufacturing a multi-layer composite material.

9. The use of a semi-finished product web according to claim 1 in tape-reinforced injection molding.

10. A multi-layer composite material, comprising at least one layer or at least two layers, each layer consisting of a semi-finished product web according to claim 1.

11. The multi-layer composite material according to claim 10, comprising one or more layers made of metal.

12. A method for manufacturing a single-ply semi-finished product web reinforced with unidirectionally orientated continuous fibers, comprising the steps of:
   a) introducing a single-ply initial semi-finished product web which is reinforced with continuous fibers orientated unidirectionally in the movement direction of the initial semi-finished product web and in which the unidirectionally orientated continuous fibers are embedded in a matrix containing at least 60% by weight of one or more thermoplastic polymers selected from the group consisting of polyamide, polyolefin and mixtures thereof, and which exhibits two opposing, parallel peripheral edges spaced apart by the width of the initial semi-finished product web and extending in the movement direction of the initial semi-finished product web, wherein the dispersal of the fibers in the initial semi-finished product web extends over the entire width;
   b) severing parallelogram-shaped segments of the initial semi-finished product web, wherein the segments exhibit two opposing, parallel cutting edges in addition to the two opposing, parallel peripheral edges, wherein one cutting edge exhibits a predetermined angle with respect to the perpendicular of the peripheral edge in the segment, the value $\beta$ of which is in the range of 0° to less than 90°, where $\alpha+\beta=90°$;
   c) positioning one or more of the segments on the semi-finished product web to be lengthened, such that the peripheral edges of the segments are parallel and overlap adjacent segments at the peripheral edges, wherein the overlap is more than 1 to 8 mm, wherein the cutting edges also lie along the movement direction of the semi-finished product web and form the peripheral edges of the new semi-finished product web, and wherein the unidirectionally orientated continuous fibers of the segments enclose a predetermined angle with the movement direction, the value of which is $\alpha$;
   d) connecting the adjacent segments by ultrasonic welding, forming a welding seam, wherein the welding seam substantially encompasses the region of the overlap of the segments.

13. The method according to claim 12 for manufacturing a single-ply semi-finished product web which is reinforced with unidirectionally orientated continuous fibers and exhibits a movement direction according to claim 1.

14. The method according to claim 12, characterized in that it is followed by a step e) of pressure-treating the welding seam, such that the thickness of the body of the web in the region of the welding seam is in the range of 1.0 to 1.5 times the other arithmetically averaged thickness of the body of the web.

15. The method according to claim 12, characterized in that in each of steps c) and d), an individual segment is positioned overlapping with the semi-finished product web to be lengthened and then ultrasonically welded, before the process is repeated at the new end of the lengthened semi-finished product web, after it has been transported further, by positioning another segment overlapping.

16. The method according to claim 12, comprising the additional step f) of winding the semi-finished product web.

* * * * *